(12) United States Patent
Beauvais et al.

(10) Patent No.: US 6,758,598 B2
(45) Date of Patent: Jul. 6, 2004

(54) INTEGRATED OIL TRANSFER SLEEVE AND BEARING

(75) Inventors: Gilles Beauvais, Montreal (CA); David Brouillet, St. Basile Le Grand (CA); Pierre Gauvin, Contrecoeur (CA); Alain Antoine Lewis, Brossard (CA)

(73) Assignee: Pratt & Whitney Canada Corp., Lóngueuil (CA)

( * ) Notice: Subject to any disclaimer, the term of this patent is extended or adjusted under 35 U.S.C. 154(b) by 0 days.

(21) Appl. No.: 10/226,263

(22) Filed: Aug. 23, 2002

(65) Prior Publication Data

US 2004/0037483 A1 Feb. 26, 2004

(51) Int. Cl.$^7$ ............................................... F16C 19/28
(52) U.S. Cl. ........................ 384/101; 384/462; 384/569; 184/5
(58) Field of Search ................................ 384/101, 462, 384/569, 570; 184/5

(56) References Cited

U.S. PATENT DOCUMENTS

| | | |
|---|---|---|
| 2,334,775 A | 11/1943 | Karp |
| 2,681,126 A | 6/1954 | Searls |
| 3,305,280 A | 2/1967 | Peterson |
| 3,821,908 A | 7/1974 | Marsch et al. |
| 4,312,546 A | 1/1982 | Bayer et al. |
| 4,370,106 A | 1/1983 | Lauterbach |
| 5,076,766 A | 12/1991 | Gutknecht |
| 5,246,087 A | 9/1993 | Schipper |
| 6,183,388 B1 | 2/2001 | Hawkins |
| 6,264,138 B1 | 7/2001 | Hawkins |
| 6,302,356 B1 | 10/2001 | Hawkins |

FOREIGN PATENT DOCUMENTS

| | | |
|---|---|---|
| EP | 0379490 | 8/1987 |
| WO | WO03/052299 | 6/2003 |

Primary Examiner—Lenard A. Footland
(74) Attorney, Agent, or Firm—Ogilvy Renault

(57) ABSTRACT

An integrated roller bearing and fluid transfer sleeve adapted for supporting and transferring fluid to a rotating shaft in a gas turbine engine reduction gearbox. The integrated roller bearing and fluid transfer sleeve comprises a fluid transfer sleeve having a sleeve casing defining therein an annular fluid plenum open radially outwardly, and at least two spaced apart roller bearing assemblies each comprising an annular outer race integral with the sleeve casing and each assembly comprising a plurality of roller elements supported by the outer race. Each roller bearing assembly is disposed within the sleeve casing, one at each opposing end thereof, and the plurality of roller elements in each assembly define a first inner diameter substantially equal to an outer diameter of the rotating shaft adapted to be supported by the roller elements. The sleeve casing has an inner circumferential, axially extending surface, between the roller bearing assemblies, and defining a second inner diameter greater than the first inner diameter, such that an annular fluid leakage clearance can be formed between said inner circumferential surface of the sleeve casing and an outer circumferential surface of the rotating shaft. A plurality of apertures are defined in the sleeve casing to permit fluid flow from the annular fluid plenum to the fluid leakage clearance, whereby fluid, in the fluid leakage clearance is transferable to the roller elements and the rotating shaft.

14 Claims, 5 Drawing Sheets

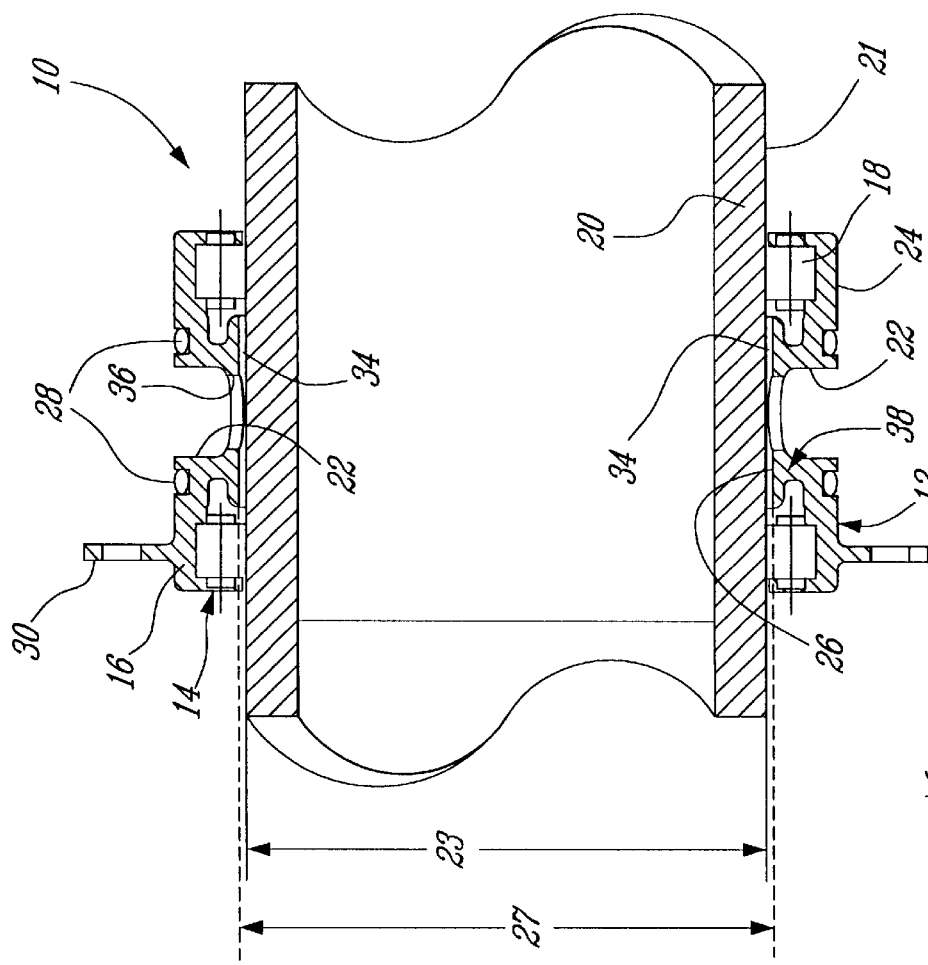
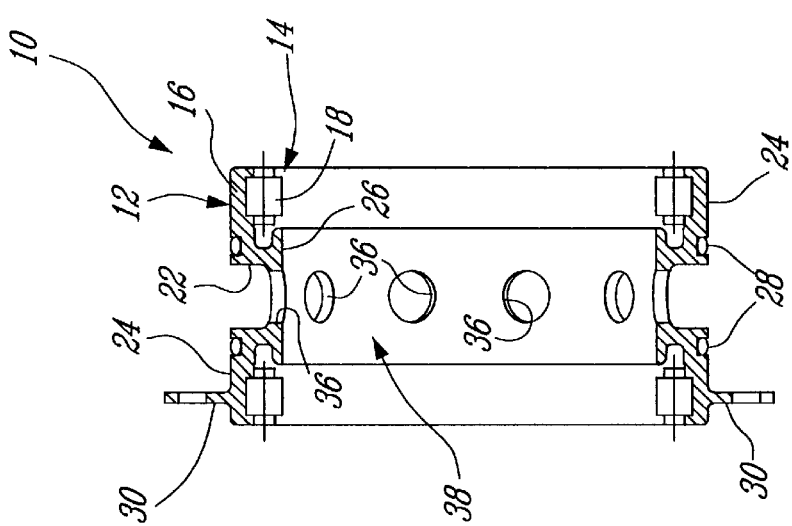

US 6,758,598 B2

INTEGRATED OIL TRANSFER SLEEVE AND BEARING

TECHNICAL FIELD

The present invention relates generally to a gas turbine engine reduction gearbox, and in particular, to an integrated roller bearing and oil transfer sleeve for use in a gas turbine engine reduction gearbox.

BACKGROUND OF THE INVENTION

Reduction gearboxes of gas turbine engines, especially those in acrobatic propeller-driven engines, experience considerable in-flight stresses resulting in significant bending of all rotating shafts within the gearbox. As these gearboxes contain gears rotating at extremely high speeds, a constant supply of oil is required for cooling and lubrication of the components. As such, it is known to feed oil to rotating gears via paths between concentric rotating parts and internal oil supply cavities within the shafts and planetary gear carriers. These oil paths and cavities can become restricted due to the flight stress-induced bending of the components, which results in a reduced oil flow to the rotating elements.

It is currently known to use an oil transfer sleeve 52 which aids distribution of oil within a gearbox 50, as shown in FIG. 1. Such a sleeve 52 generally receives oil from an outer chamber 54, and provides distribution of the oil to inner rotating elements such as the planetary carrier 56 and the planet gears 58. An oil film can be provided within the inner diameter of the oil transfer sleeve 52, creating a journal bearing for supporting the inner rotating shaft 60 of the planetary carrier 56, for example. Internal oil feed cavities 62 within the inner shaft 60 that is supported by the journal bearing can become pinched by bending forces, resulting in reduced oil flow to the rotating gears.

There is therefore a need for a new shaft supporting member which reduces shaft bending and provides oil to the shaft inner cavities.

SUMMARY OF THE INVENTION

It is an object of the present invention to provide a bearing element which reduces shaft bending in a gas turbine engine gearbox.

It is a further object of the present invention to provide a roller bearing assembly integrally formed with a fluid transfer sleeve capable of lubrication fluid distribution.

Therefore, in accordance with the present invention, there is provided an integrated roller bearing and fluid transfer sleeve adapted for supporting and transferring fluid to a rotating shaft in a gas turbine engine reduction gearbox, the integrated roller bearing and fluid transfer sleeve comprising: a fluid transfer sleeve comprising a sleeve casing defining therein an annular fluid plenum open radially outwardly; at least two spaced apart roller bearing assemblies each comprising an annular outer race integral with the sleeve casing and each assembly including a plurality of roller elements supported by said outer race, each roller bearing assembly being disposed within the sleeve casing, one at each opposing end thereof, and the plurality of roller elements in each assembly defining a first inner diameter substantially equal to an outer diameter of the rotating shaft adapted to be supported by the roller bearing assemblies; the sleeve casing having an inner circumferential, axially extending surface, between said roller bearing assemblies, and defining a second inner diameter greater than said first inner diameter, such that an annular fluid leakage clearance can be formed between said inner circumferential surface of the sleeve casing and an outer circumferential surface of the rotating shaft; and at least one aperture being defined in the sleeve casing, permitting fluid flow from the annular fluid plenum to the fluid leakage clearance; whereby fluid in the fluid leakage clearance is transferable to the roller elements of the roller bearing assemblies and to the rotating shaft.

There is also provided, in accordance with the present invention, a composite bearing assembly adapted for supporting a rotating shaft in a gas turbine engine reduction gearbox, the composite bearing assembly comprising: a substantially cylindrical sleeve casing having at least a roller bearing disposed at each end thereof; the roller bearing comprising an outer race, integrally formed with the sleeve casing, and a plurality of roller elements supported by the outer race and disposed radially inward therefrom; and the sleeve casing comprising a central portion, axially located between the roller bearings, comprising an inner circumferential surface having an internal diameter greater than an outer diameter of the rotating shaft adapted to be supported by the roller bearings, such that an annular fluid leakage clearance, adapted to receive a fluid therein, is formed between said inner circumferential surface and an outer surface of the rotating shaft; whereby the composite bearing assembly provides both direct rolling contact and hydrodynamic support for the rotating shaft.

BRIEF DESCRIPTION OF THE DRAWINGS

Further features and advantages of the present invention will become apparent from the following detailed description, taken in combination with the appended drawings, in which:

FIG. 4a is a cross-sectional view of the integrated fluid transfer sleeve and roller bearing of FIG. 3.

FIG. 4b is an enlarged cross-sectional view of the integrated fluid transfer sleeve and roller bearing of FIG. 4a mounted on a shaft.

DETAILED DESCRIPTION OF THE PREFERRED EMBODIMENT

Figure 1:
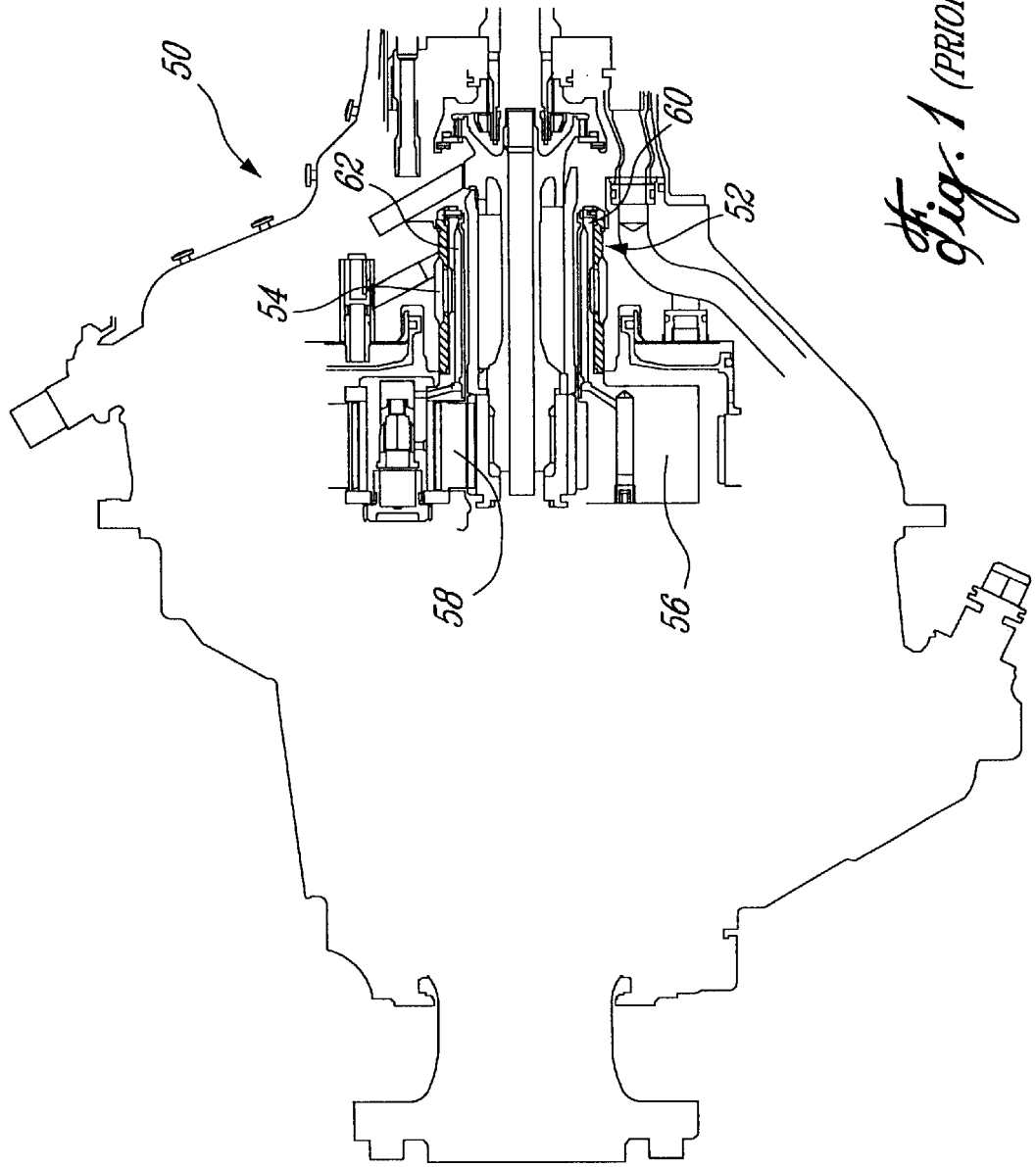
FIG. 1 is a cross-sectional view of a gas turbine engine planetary gearbox of the prior art having an transfer sleeve.
Figure 2:
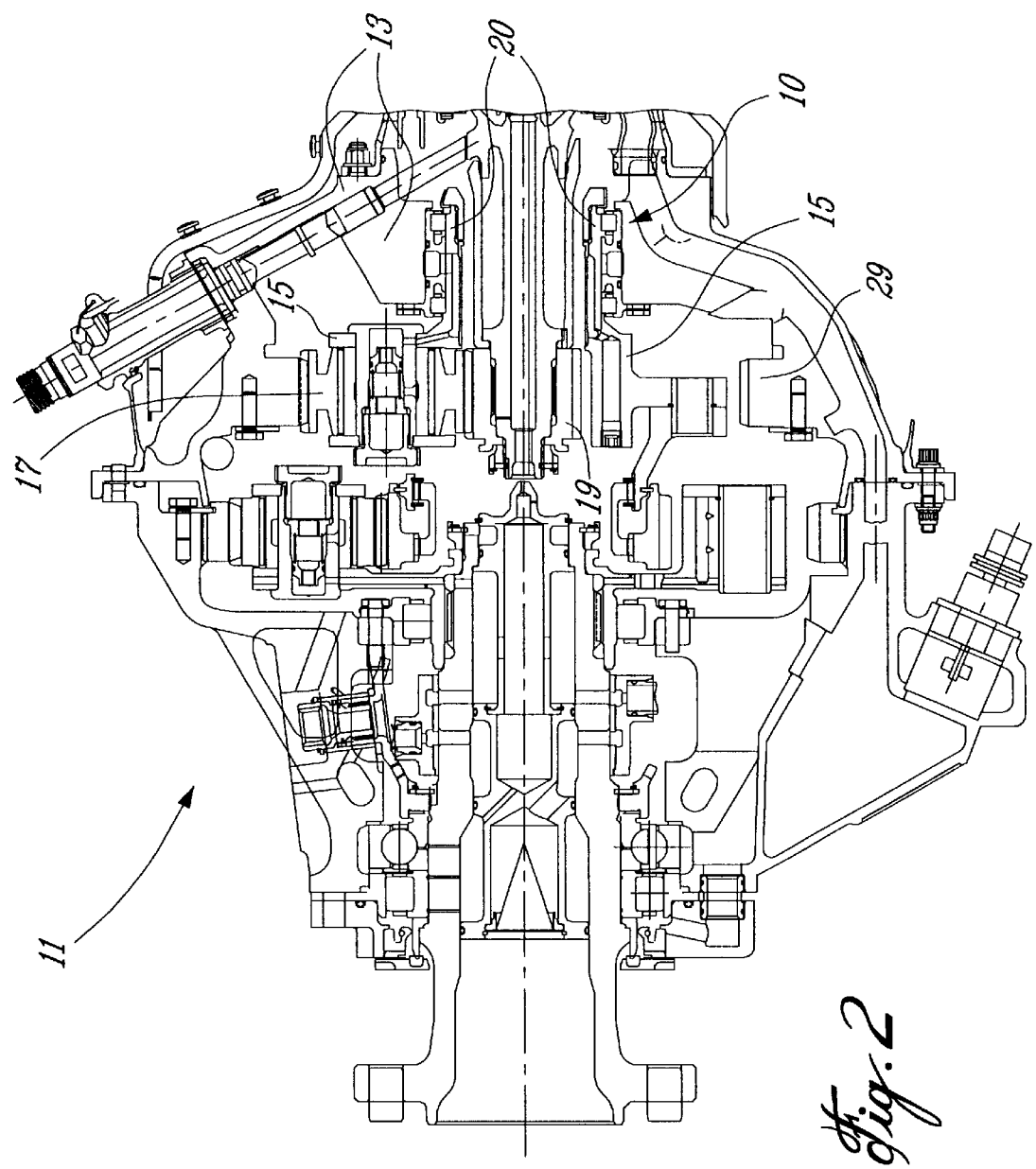
FIG. 2 is a cross-sectional view of a gas turbine engine planetary gearbox according to the present invention comprising an integrated fluid transfer sleeve and roller bearing assembly.

As generally seen in FIG. 2, the first reduction stage of a gas turbine engine reduction gearbox 11 having a gearbox casing 13, comprises a rotatable planetary carrier shaft 20 of the planetary carrier 15, planet gears 17, a central rotating sun gear 19, and an outer static ring gear 29. A fluid transfer sleeve assembly 10 of the present invention comprises bearing members 14 adapted to support the planetary carrier shaft 20 and provides lubricating fluid distribution to the rolling elements of the bearing members 14 and to other rotating parts of the gearbox such as the planet gears.

Figure 3:
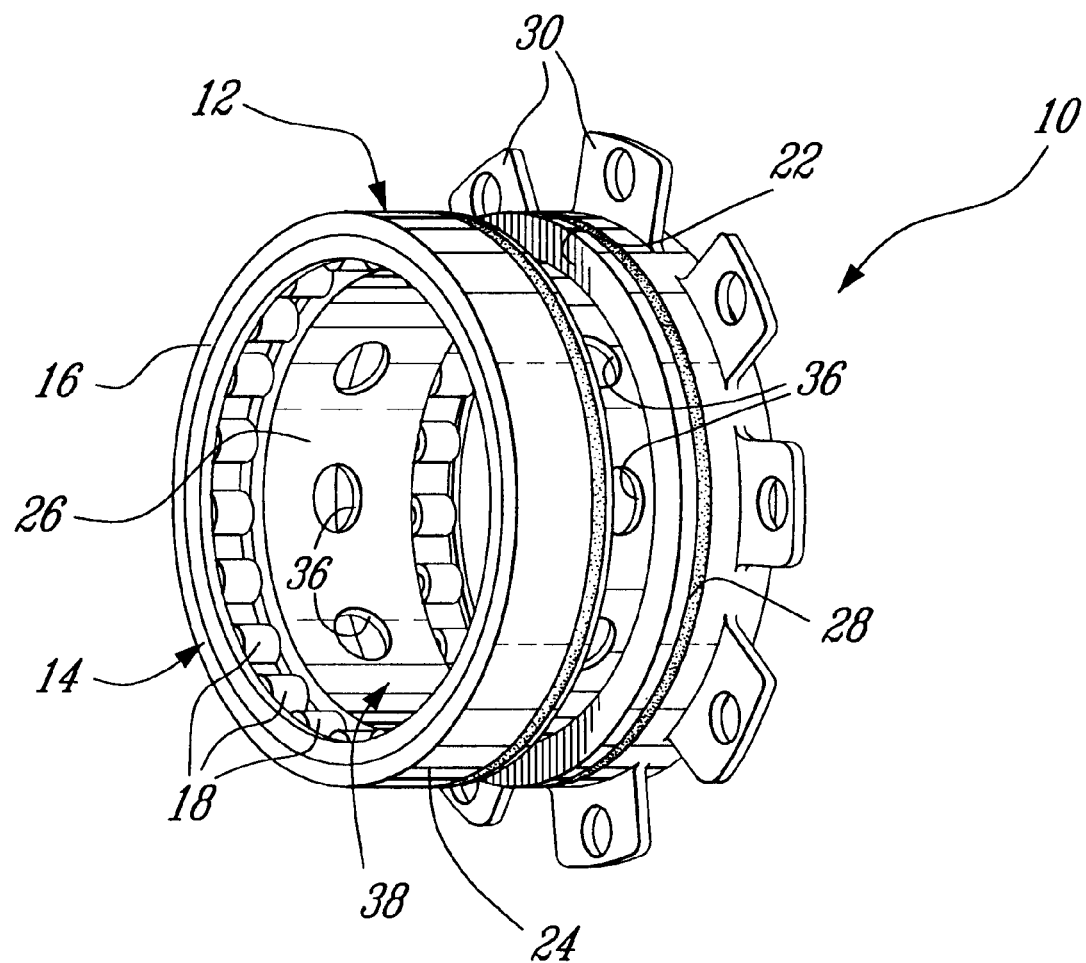
FIG. 3 is a perspective view of the integrated fluid transfer sleeve and roller bearing of the present invention.

Referring to FIG. 3, the fluid transfer sleeve assembly 10 generally comprises an outer sleeve casing 12, defining a central annular fluid plenum 22, and having a bearing member 14 disposed at either end of the cylindrical sleeve casing. The bearing members 14 have no inner bearing races, and the bearing outer races are integrally formed with the sleeve casing 12. The bearing members are preferably roller bearings, having a plurality of cylindrical roller elements 18 adapted to directly contact and support a centrally extending rotating shaft, such as the planetary carrier shaft 20 as shown in the gas turbine engine application depicted in greater detail in FIG. 4, which will be described in further detail below.

The sleeve casing 12 comprises a plurality of radially extending flanges 30, circumferentially disposed about one end of the sleeve casing, adapted for engaging the fluid transfer sleeve assembly 10 to a static housing member.

Referring to FIG. 4a, the central, radially innermost annular portion 38 of the sleeve casing, separating the two roller bearing members 14 and forming an axially extending inner band partially defining the fluid plenum 22 radially outward therefrom, comprises a plurality of apertures 36 extending radially through the annular wall portion 38. The apertures 36 are depicted as circular holes in the figures; however, it is to be understood that apertures of any shape could equivalently be used. To ensure a circumferentially even distribution of lubrication fluid from the statically mounted fluid transfer sleeve to the inner rotating shaft, the apertures preferably have an even circumferential spacing. Additionally, the number of apertures can be equivalently varied, depending on the size of each aperture. For example, more numerous but smaller-sized apertures could be used, and these could be arrange in several rows or in another configuration adapted for best transmittal of the fluid to the shaft. Similarly, if an additional linking member is used to join the two outer bearing members 14, the plurality of apertures 36 could actually be a single, annular slot formed in the central portion 38 of the sleeve casing.

As best seen in FIG. 4b, the apertures 36 ensure sufficient fluid flow communication between the fluid plenum 22 and an annular fluid leakage clearance 34, precisely defined between the inner circumferential surface 26 of the central portion 38 of the sleeve casing 12 and an outer circumferential surface 21 of a shaft 20 extending therethrough. The annular fluid leakage clearance 34, exaggerated in FIG. 4b for ease of understanding only, is formed as a result of the inner diameter 27 of the central portion 38 of the sleeve casing being slightly greater than the outer diameter 23 of the central shaft 20. This also eliminates any risk of the sleeve casing rubbing on the shaft, when the bearings must support high radially directed loads or shaft misalignment. In a example of the preferred embodiment, there is preferably a diametrical clearance of approximately 0.003 to 0.004 inch between the inner circumferential surface 26 and the shaft 20, forming the fluid leakage clearance 34. The internal clearance of the bearing, the play between the shaft 20, the roller elements 18 and the outer ring casing 12, is preferably between 0.0005 and 0.0015 inch.

The apertures 36 ensure that lubrication fluid from the fluid plenum 22 can be fed, generally by pressure, into the thin annular fluid leakage clearance 34, creating a thin fluid film around the rotating shaft within the central inner portion 38 of the sleeve casing, creating a central hydrodynamically lubricated portion, disposed between the two outer direct contact rolling element bearings 14, that is similar to a standard journal bearing.

The annular fluid leakage clearance is axially open-ended, such that continually fed fluid forced axially forward and backward lubricates the rolling elements 18 of the bearing members 14, such that there is significantly reduced bearing wear. The precise fluid leakage gap 34 is dimensioned to ensure adequate lubrication of rolling elements 18, adjacent the central annular fluid leakage gap at either end of the fluid transfer sleeve, and to maintain the lubricating fluid pressure in the fluid leakage clearance 34 such that the fluid is transferred from the static sleeve to rotating parts, such as to the planetary carrier shaft 20 and consequently also to other rotating elements of the planetary gear system.

Two O-ring seals 28 are preferably located partially within the outer circumferential surface 24 of the sleeve casing 12, on either side of the fluid plenum 22. The seals 28 ensure that lubrication fluid is retained within the fluid plenum 22 when the fluid transfer sleeve assembly is disposed within an aperture of a surrounding housing. The only seals required by the present invention are therefore only located on the outer circumferential surface 24 of the entire fluid transfer sleeve assembly 10. No seals are required to limit the axial fluid leakage away from the bearing sleeve assembly, thereby eliminating any seals that are required to be in continuous contact with the rotating part and which thereby causing undue premature wear. The controlled gap of the annular fluid leakage clearance 34 limits itself the outflow of lubrication fluid.

Figure 5:
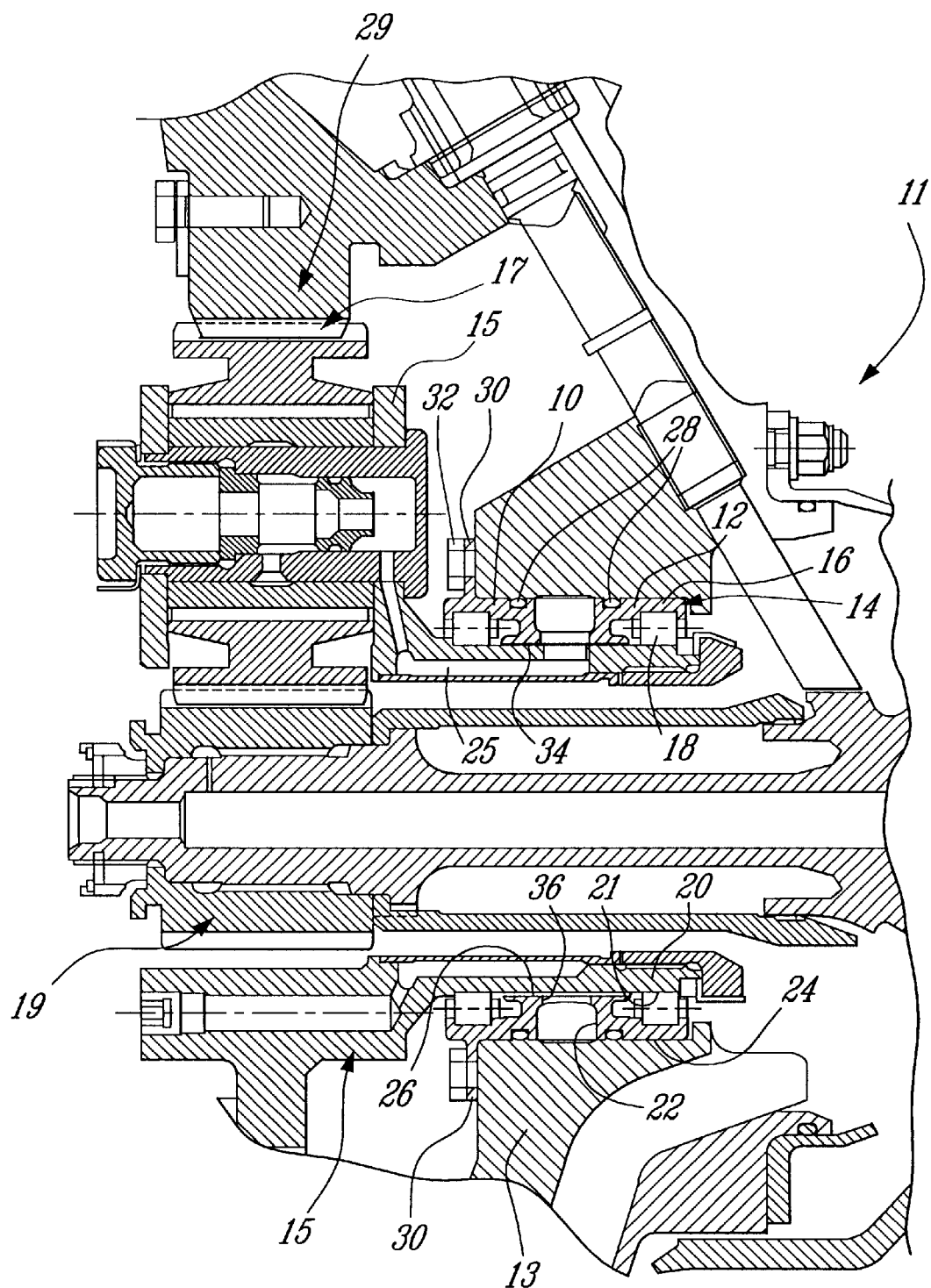
FIG. 5 is an enlarged, partial cross-sectional view of the integrated fluid transfer sleeve and roller bearing assembly of the planetary gearbox shown in FIG. 2.

Referring to FIG. 5, the gas turbine engine reduction gearbox 11 comprises the fluid transfer sleeve assembly 10, located within the reduction gearbox casing 13 and retained thereto via threaded fasteners 32, used to fix the plurality of sleeve casing flanges 30 to the gearbox housing 13. This prevents any axial or rotary movement of the fluid transfer sleeve. Although a plurality of sleeve casing flanges 30 are depicted and described, a single radially extending flange having circumferentially spaced holes therein could equivalently be used. The multiple bearing flanges 30 are preferably used for reasons of weight reduction. The bearing flanges 30 also ensure perpendicularity of the roller bearing members 14 with the reduction gearbox housing 13. The roller elements 18 of the bearing members 14 are in direct rolling contact with the outer circumferential surface 21 of the rotating planetary carrier shaft 20, and therefore close tolerances of the sleeve casing 12 and the rolling elements 18 must be guaranteed. Low roller bearing maximum internal radial clearances and eccentricity with respect to the reduction gearbox housing must be maintained in order to ensure good overall performance. The thickness of the sleeve casing 12 joining the outer races 16 of the bearing members 14 can also be adjusted to ensure compliance with these tight tolerances required. By having only one set of sleeve casing flanges 30 supporting the entire integrally formed fluid transfer sleeve and bearing assembly, the accumulation of eccentricities is further minimised.

The planetary carrier 15 generally comprises planet gears 17 supported by journal bearings, which are fed lubricating fluid from the annular fluid leakage clearance 34, via internal fluid passages 25 of the planetary shaft. A plurality of slots or holes 31 in the shaft 20 permit the pressurised lubrication fluid in the annular fluid leakage clearance 34 to be fed into the internal passages 25. As with common planetary gear trains used with gas turbine engines, the planet gears 17, supported by the planetary carrier 15, are driven by a central sun gear 19 and revolve within a radially outer static ring gear 29, thereby rotating the planetary carrier 15 whose shaft 20 is supported by the roller bearing members 14 integrally formed within the fluid transfer sleeve assembly 10.

What is claimed is:

1. An integrated roller bearing and fluid transfer sleeve adapted for supporting and transferring fluid to a rotating shaft in a gas turbine engine reduction gearbox, the integrated roller bearing and fluid transfer sleeve comprising:

a fluid transfer sleeve comprising a sleeve casing defining therein an annular fluid plenum open radially outwardly;

at least two spaced apart roller bearing assemblies each comprising an annular outer race integral with the sleeve casing and each assembly including a plurality of roller elements supported by said outer race, each roller bearing assembly being disposed within the sleeve casing, one at each opposing end thereof, and the plurality of roller elements in each assembly defining a first inner diameter substantially equal to an outer diameter of the rotating shaft adapted to be supported by the roller bearing assemblies;

the sleeve casing having an inner circumferential, axially extending surface, between said roller bearing assemblies, and defining a second inner diameter greater than said first inner diameter, such that an annular fluid leakage clearance can be formed between said inner circumferential surface of the sleeve casing and an outer circumferential surface of the rotating shaft; and at least an aperture being defined in the sleeve casing, permitting fluid flow from the annular fluid plenum to the fluid leakage clearance;

whereby fluid in the fluid leakage clearance is transferable to the roller elements of the roller bearing assemblies and to the rotating shaft.

2. The integrated roller bearing and fluid transfer sleeve as defined in claim 1, wherein the fluid transfer sleeve transfers cooling and lubrication fluid to rotating elements of the gearbox.

3. The integrated roller bearing and fluid transfer sleeve as defined in claim 1, wherein the gearbox is a planetary gearbox.

4. The integrated roller bearing and fluid transfer sleeve as defined in claim 3, wherein the roller bearing assemblies support a first stage planetary carrier shaft of the planetary gearbox.

5. The integrated roller bearing and fluid transfer sleeve as defined in claim 1, wherein a radially extending bearing flange, adapted to be fixed to a static outer housing, protrudes from the sleeve casing, whereby the fluid transfer sleeve is axially located within the outer housing and perpendicularly positioned with respect to the rotating shaft.

6. The integrated roller bearing and fluid transfer sleeve as defined in claim 1, wherein seals are provided on an outer circumferential surface of the sleeve casing, disposed on either side of the annular fluid plenum.

7. The integrated roller bearing and fluid transfer sleeve as defined in claim 6, wherein the seals are O-rings.

8. A composite bearing assembly adapted for supporting a rotating shaft in a gas turbine engine reduction gearbox, the composite bearing assembly comprising:

a substantially cylindrical sleeve casing having at least a roller bearing disposed at each end thereof;

the roller bearing comprising an outer race, integrally formed with the sleeve casing, and a plurality of roller elements supported by the outer race and disposed radially inward therefrom; and the sleeve casing comprising a central portion, axially located between the roller bearings, comprising an inner circumferential surface having an internal diameter greater than an outer diameter of the rotating shaft adapted to be supported by the roller bearings, such that an annular fluid leakage clearance, adapted to receive a fluid therein, is formed between said inner circumferential surface and an outer surface of the rotating shaft;

whereby the composite bearing assembly provides both direct rolling contact and hydrodynamic support for the rotating shaft.

9. The composite bearing assembly as defined in claim 8, wherein the annular fluid leakage clearance is axially open ended, such that the fluid received therein can be transferred to the roller elements of the roller bearings and to the rotating shaft to provide lubrication and cooling thereof.

10. The composite bearing assembly as defined in claim 9, wherein the fluid is transferred to rotating elements of the reduction gearbox.

11. The composite bearing assembly as defined in claim 8, wherein the sleeve casing comprises an annular fluid plenum, open radially outwardly, defined therein.

12. The composite bearing assembly as defined in claim 11, wherein the annular fluid plenum is disposed radially outwards from the annular fluid leakage clearance and is in fluid flow communication therewith via at least an aperture defined in the sleeve casing.

13. The composite bearing assembly as defined in claim 8, wherein the reduction gearbox is a planetary gearbox.

14. The composite bearing assembly as defined in claim 13, wherein the composite bearing assembly supports a first stage planetary carrier of the planetary gearbox.

* * * * *